(12) United States Patent
Luiz

(10) Patent No.: US 7,128,250 B2
(45) Date of Patent: Oct. 31, 2006

(54) METHOD FOR CUTTING THE EDGES OF A CONTINUOUS GLASS RIBBON, A DEVICE FOR IMPLEMENTING SAID METHOD, AND A GLASS PLATE CUT USING SAID METHOD

(75) Inventor: Mauro Lucio Nascimento Luiz, Sao Paulo (BR)

(73) Assignee: Saint-Gobain Glass France, Courbevoie (FR)

( * ) Notice: Subject to any disclaimer, the term of this patent is extended or adjusted under 35 U.S.C. 154(b) by 166 days.

(21) Appl. No.: 10/466,047

(22) PCT Filed: Jan. 8, 2002

(86) PCT No.: PCT/FR02/00038

§ 371 (c)(1),
(2), (4) Date: Jul. 11, 2003

(87) PCT Pub. No.: WO02/055444

PCT Pub. Date: Jul. 18, 2002

(65) Prior Publication Data

US 2004/0060416 A1    Apr. 1, 2004

(30) Foreign Application Priority Data

Jan. 12, 2001   (FR) .................... 01 00436

(51) Int. Cl.
*C03B 33/03*      (2006.01)
(52) U.S. Cl. ......................... 225/2; 225/96.5
(58) Field of Classification Search ............ 225/2, 225/3, 4, 5, 96, 96.5, 103, 104, 105
See application file for complete search history.

(56) References Cited

U.S. PATENT DOCUMENTS

| 4,049,167 | A | * | 9/1977 | Guissard ..................... 225/2 |
| 4,072,259 | A | * | 2/1978 | Welton ........................ 225/2 |
| 4,136,807 | A | * | 1/1979 | DeTorre ...................... 225/2 |
| 4,140,820 | A | * | 2/1979 | DeTorre .................... 427/292 |
| 4,196,830 | A | * | 4/1980 | Oravitz et al. ............... 225/2 |
| 4,225,070 | A | * | 9/1980 | Dahlberg et al. ............. 225/2 |
| 4,285,451 | A | * | 8/1981 | Ferraino ..................... 225/2 |
| 4,291,824 | A | * | 9/1981 | DeTorre ...................... 225/2 |
| 4,454,972 | A |   | 6/1984 | Maltby |
| 4,466,562 | A |   | 8/1984 | DeTorre |
| 5,776,220 | A | * | 7/1998 | Allaire et al. .............. 65/112 |

* cited by examiner

Primary Examiner—Charles Goodman
(74) Attorney, Agent, or Firm—Oblon, Spivak, McClelland, Maier & Neustadt, P.C.

(57) ABSTRACT

A method for cutting the edges of a continuous glass ribbon (10), moving at a speed VR, comprising a longitudinal marking stage which generates a marking line, in particular using a cutting wheel (11), a transverse marking stage, and a subsequent transverse breaking stage. The inventive method also comprises an intermediary stage between the longitudinal marking stage and the transverse marking stage consisting in generating at least one longitudinal fissure (32) through at least a substantial part of the thickness of the continuous glass ribbon, or through the entire thickness of the continuous glass ribbon, on the basis of the marking line (30), and in spreading said longitudinal fissure at a speed VF, which is more or less equal to but in the opposite direction to the speed VR of the moving continuous glass ribbon. The invention also relates to a device designed to carry out said method. The glass plates cut using the inventive method have edges, advantageously, without any major defects.

20 Claims, 2 Drawing Sheets

METHOD FOR CUTTING THE EDGES OF A CONTINUOUS GLASS RIBBON, A DEVICE FOR IMPLEMENTING SAID METHOD, AND A GLASS PLATE CUT USING SAID METHOD

BACKGROUND OF THE INVENTION (1) Field of the Invention

The invention relates to the field of the production of flat glass and relates more specifically to a method for cutting a continuous glass ribbon.

A continuous glass ribbon is to be understood as meaning a glass ribbon coming from a continuous forming process, particular a float process or a glass rolling process.

(2) Description of Related Art

In general, a continuous glass ribbon is produced from a glassmaking furnace into which vitrifiable raw materials are introduced and melted to form a viscous glass. This viscous glass is fed to a forming tool, such as a float for example, where the viscous glass is poured out onto a bath of molten tin held in a reducing atmosphere, or a rolling mill. This then yields, at the output from the forming tool, a continuous glass ribbon that has to be cut for later applications, particularly for applications in the field of building and/or the motor vehicle.

The traditional method used for cutting glass consists first of all in annealing the glass ribbon then in cutting it in the transverse direction into plates and then cutting the edges off these plates in the longitudinal direction.

The term "annealing" is given, in the usual way, to the operation that consists in causing the glass ribbon to undergo a controlled cooling cycle so as to progressively relieve the stresses induced by the forming step.

The "transverse direction" is the term given to an axis roughly perpendicular to the axis of travel of the glass ribbon leaving the forming tool.

The term "longitudinal direction" is given to an axis roughly parallel to the axis of travel of the glass ribbon leaving the forming tool.

The term "plates" is given to elements of the glass ribbon once it has been cut in the transverse direction.

The traditional method of cutting a continuous glass ribbon involves four main steps after the glass ribbon has been annealed:

first step: longitudinal marking, particularly using a cutting wheel, of a roughly continuous notch along each of the edges of one side of the ribbon in the longitudinal direction. This marking is performed a few centimeters to a few tens of centimeters away from the outside edge of the ribbon. Its purpose is to create surface defects on the glass to prepare for the subsequent cutting-off of the edges of the ribbon, an operation known as "edge trimming".

second step: marking a continuous notch along one side of the ribbon in the transverse direction. This marking is performed in particular with a cutting wheel which moves at an angle to the axis of travel of the glass ribbon, so as to obtain on the ribbon a marking perpendicular to the axis of travel.

third step: division of the ribbon at the transverse marking to form a plate from the continuous ribbon. This step is known as "transverse breakage". The plate thus formed is then generally transported by rolls at a rate very much higher than the velocity at which the continuous ribbon travels.

fourth step "edge trimming": separation of the region between the outside edge of the plate and the marked line, the region termed the "edge", from the remainder of the plate to obtain a plate which constitutes a finished or part-finished product which is then stored, generally roughly vertically, then dispatched to the customer on easels.

This fourth step, the edge trimming, first of all comprises a phase in which a shock is produced, for example using a metal wheel, at the top of the plate, at the location where the longitudinal marking was made. The shock creates an addition of energy such that a crack develops and follows the fault line of the marking. A crack generated under these conditions propagates very quickly, particularly at the speed of sound, namely about 1 000 m per second. The edge strip becomes detached therefore from the plate and is removed. In the case of thick glass, the propagation of the crack may be assisted with the use of hammers, particularly pneumatic ones, that generate regular impacts on the underside of the plate.

The transverse-breakage technique is described in particular in patent U.S. Pat. No. 4,072,259.

The edge trimming technique has been improved many times, these being set out, for example, in patents U.S. Pat. No. 4,196,830, U.S. Pat. No. 4,285,451, U.S. Pat. No. 4,466,562 and U.S. Pat. No. 4,489,870.

Those patents describe improvements to the conventional technique mentioned hereinabove, particularly and respectively the possibility of easing the edge trimming by local heating/cooling of the glass, of cutting off the edges from two parallel longitudinal markings on the same side, or from two longitudinal markings facing each other, on each side of the glass, of developing means to apply a moment to the edge strip by applying a load close to the outside edge of the edge strip so as to open up the crack starting from the marking.

It will be noted that all these improvements relate to means that come into effect after the continuous ribbon has been cut to form plates, that is to say after the transverse breakage.

These traditional edge-trimming techniques are relatively well suited to the industrial processes used to produce glass of standard thickness, particularly between 3 and 8 mm thick.

However, numerous problems arise in cutting the edges off when the thickness of the ribbon is either smaller than or greater than the thickness used in standard glass.

In the case of thin glass, particularly where the thickness is less than or equal to 1 mm, splintering is very often observed (see, for example: "lateral cracks", Fractography of Glass—Bradt, R. C.; Tressler, R. E., Plenum Press, New York, 1994) on the trimmed edge face using traditional techniques. This type of defect detracts considerably from the mechanical properties of the glass. Such defects are unacceptable to the customer and lead to very high reject rates.

In the case of thick glass, particularly where the thickness is greater than or equal to 10 mm, particularly greater than or equal to 15 mm, edge faces trimmed using the traditional techniques are found that have numerous defects. On the one hand, the edge faces are not generally perpendicular to the largest sides (the sides corresponding to the horizontal faces of the continuous glass ribbon) but cut at a bevel.

Numerous defects that may cause mechanical weakness are also found, particularly those known by those skilled in the art as flakes, burrs, broken corners, and branched cracks.

This type of defect needs to be eliminated so that the plates can be used as finished products, particularly in applications where it is desirable to toughen the glass because the toughening operation very highly stresses defects in the glass and often leads to breakage if defects are present.

It should be noted that most production of thick glass is intended for applications where the glass needs to be toughened.

To eliminate such defects introduced by the edge trimming using traditional techniques, a shaping step is performed, this consisting in removing material, particularly by abrasion, so as to straighten up the edges and obtain a face free of defects likely to lead to breakage during toughening. This operation is lengthy and expensive.

SUMMARY OF THE INVENTION

The objective of the present invention is to overcome the above disadvantages, particularly by making it possible to obtain edge faces which, after edge trimming, are devoid of major defects and thus allow the use of the plates produced with little or even no shaping, in the subsequent steps that lead to the production of a finished or part-finished product.

The problem of obtaining edge faces devoid of major defects after the edge trimming of plates originating from a continuous glass ribbon is solved by the use of a method for cutting the edges of a continuous glass ribbon traveling at a velocity $V_R$, comprising a longitudinal marking step that generates a marked line, particularly with a cutting wheel, a subsequent transverse marking step, and then a transverse breaking step, and which comprises an intermediate step between the longitudinal marking step and the transverse marking step that consists in generating at least one longitudinal crack in at least a substantial part of the thickness of the continuous glass ribbon, particularly throughout the thickness of said continuous glass ribbon, from the marked line and in causing said longitudinal crack to propagate at a velocity $V_F$ roughly equal to and in the opposite direction from the velocity $V_R$ at which the continuous glass ribbon is traveling.

The inventors actually have been able to demonstrate that it is possible in this way to obtain plates with edges roughly perpendicular to the sides of said plates and that these edges have an almost smooth surface, known by the name of mirrored surface.

This appreciable effect is particularly surprising because it is known to those skilled in the art that the edges obtained after edge trimming using the conventional techniques are of mediocre quality and have numerous defects, particularly in the case of thin glass plates and thick glass plates.

With the method according to the invention, it is found that the edges are smooth and free of major defects for all glass plate thicknesses, particularly for thick glass and thin glass.

Implementation of this method leads to a device that is remarkably simple, but highly effective.

The means used to generate a longitudinal crack are advantageously arranged near each outside edge of the continuous glass ribbon so as to propagate a crack simultaneously along each edge of the ribbon and subsequently cause the trimming off of each of the edge strips at the same time.

A crack is thus seen to appear along a line through a substantial part of the thickness of the glass, particularly at least half the thickness, or even a penetrating crack, upstream of the means for generating the crack and downstream of the longitudinal marking means. In the remainder of this text, this crack will be known as the "longitudinal crack". This longitudinal crack, visible with the naked eye with practically all glasses, seems to be practically stationary to an observer situated beside the line. This is because the resultant velocity between the velocity at which the glass ribbon is traveling $V_R$ and the rate of propagation of the crack $V_F$ is practically zero. "Practically" should be understood as meaning a possible variation of the order of a factor of 2. This variation may give an observer situated beside the line the impression that the crack is traveling, while at the same time remaining situated between the means generating it and the longitudinal cutting means.

The variations in the velocity at which the crack propagates may, in particular, be associated with the heterogeneities of the residual stresses in the glass, following the annealing operation.

The continuous glass ribbon thus consists of three regions once the longitudinal crack has been generated: two edge regions and a central region. When the crack is a penetrating one, these regions seem to be contiguous and it can usually be said that they "remain stuck" together, even though there is nothing holding them together. The transverse marking operation is then performed right across these three regions. A breaking step follows on from this, in which step known means are used to initiate and propagate a penetrating crack that leads to the parting of a plate from the glass ribbon.

Breaking is performed in particular by raising the ribbon at the transverse marking level using a roll in contact with the ribbon across its entire width, placing its entire cross section into bending.

In the case of the method as claimed in the invention, this step has a dual purpose because it gives rise both to the parting of the plate from the ribbon and also to the separation of the edge regions, the edge strips, which then detach themselves from the central region and are collected in bins.

According to one embodiment of the invention, the longitudinal crack is generated and propagates by progressive bending of the continuous glass ribbon in a region situated under the longitudinal marked line between the longitudinal marking and the transverse marking.

In this way, the introduction of bending allows a longitudinal crack to develop from the longitudinal marked line and it propagates in the opposite direction to the direction in which the glass ribbon is traveling.

What happens is that the gradual bending allows very precise control over the opening up of the longitudinal crack and control over the rate at which the crack thus generated is propagated.

According to a particularly advantageous alternative form, the continuous glass ribbon is bent by applying a force $F_I$ to the underside of said continuous glass ribbon so as to lift the glass ribbon slightly in a region situated under the longitudinal marked line or alternatively near the longitudinal marked line on the side of this line furthest away from the outside edge of the ribbon when considering the closest outside edge.

To give a more concrete idea, the load applied to such a wheel is of the order of 1 000 N, that is to say preferably between 500 and 2 000 N.

For a glass ribbon 15 mm thick from which it is desired to remove edges about 200 mm wide, it is possible in particular to apply a force of about 900 N, when this force is applied about 70 cm from the fulcrum.

For a glass ribbon 19 mm thick, from which it is desired to remove edges about 250 mm wide, a force of about 1 200 N may in particular be applied.

These indications are not in any way limiting because the load that has to be applied depends on the state of annealing of the glass, and the person skilled in the art can readily determine this by varying said load may slightly observing the effect that this variation in load has on the progress of the longitudinal crack.

According to another preferred embodiment of the invention, a force $F_s$ is applied to the top side of the continuous glass ribbon in a region lying between the longitudinal marked line and the outside edge of the continuous glass ribbon to contribute to the generation and propagation of the longitudinal crack.

This embodiment is particularly suited to the production of glass of thin and medium thickness, and encourages the guidance of the longitudinal crack so as to make it easier to cause it to propagate in line with the longitudinal marking.

Although the application of a bearing force to the top face is not essential for thick glass, particularly glass more than 15 mm thick, this embodiment is not precluded with these glasses. It may even prove particularly advantageous where there is a desire to reduce the width of the edge trimmings and thus make savings on material allowing the efficiency of the line to be increased.

According to another embodiment of the method according to the invention, one or more applications of heat and/or of cooling contributes or contribute to the generation and propagation of the longitudinal crack.

The application of heat may, in particular, be obtained by use of a laser beam which interacts with the glass, the laser beam being collimated to be focused onto the top side of the glass ribbon.

Cooling can be obtained in particular by at least one roll, preferably a roll situated on each side of the crack, in contact with the underside of the glass. This type of cooling roll is likely to be cooled by a liquid with which it is in contact, for example a cooled liquid contained in a tank into which the roll is plunged.

The invention also relates to a device designed to implement the method according to the invention.

This device for cutting off the edges of a continuous glass ribbon comprises longitudinal marking means, transverse marking means, transverse breaking means and further comprises means, particularly mechanical means, for generating and propagating the longitudinal crack.

In a preferred embodiment of the device according to the invention, at least one mechanical means for generating and propagating the longitudinal crack is a wheel that can be brought into contact with the underside of a continuous glass ribbon.

In a particularly advantageous version, at least one wheel is slaved by slaving means, particularly comprising a ram, particularly connected to a base, in such a way that either the position of this wheel is fixed or the force $F_I$ applied under the continuous glass ribbon is constant.

According to one embodiment of this device, at least one mechanical means for generating and propagating the longitudinal crack is a wheel situated on the top side of the continuous glass ribbon, and particularly connected to a ram.

It is possible, as an equivalent to the wheels described above, to use one or more rollers over which the glass can slide without being damaged. It is, for example, possible to use rollers made of copper coated with a layer of $MoS_2$.

According to another alternative form of this device, the mechanical means are replaced or supplemented by at least one means of applying heat or cooling to at least one region of one side of the continuous glass ribbon, this means being situated between the longitudinal marking means and the transverse marking means.

According to a preferred embodiment, at least one means of applying heat and/or cooling is a heated (or cooled) roll in contact with a top (or bottom) surface of the continuous glass ribbon.

In an equivalent way, it is possible to use a heated and/or cooled roller. Furthermore, a wheel and/or a roller may simultaneously be a mechanical means capable of applying a shape $F_I$ or $F_s$ under or on the glass ribbon, and be a means of respectively applying cooling or heating.

It is possible, for example, to use wheels or rollers through which a heat transfer fluid, for example liquid nitrogen, or a heated liquid, passes.

It is thus possible, by creating a thermal gradient in the thickness of the glass, to establish a stress system equivalent to that established by bending and thus contribute to generating and propagating a longitudinal crack.

According to another embodiment, at least one means of applying heat is a laser.

The invention also relates to a glass plate obtained by the method as claimed in the invention, where the longitudinal edge faces are more or less perpendicular to the underside and top side of the plate and has a mirrored surface.

As mentioned above, such a plate is particularly advantageous because it makes it possible to considerably reduce the subsequent shaping operations.

The thick glass plates according to the invention are particularly well suited for producing products made of thick glass, particularly at least 10 mm thick, or 15 mm or more thick, and even 17 mm or more thick, for example for applications in building or interior decorating.

Thin glass plates according to the invention are particularly suited for producing products in thin glass, particularly 1 mm thick or less, for example for applications as screens.

In general, the glass plates according to the invention are particularly suited to the production of articles made of toughened glass.

Other details and advantageous features of the invention will become apparent hereinbelow, from the description of some exemplary embodiments of the invention with reference to the attached figures which depict:

DETAILED DESCRIPTION

Figure 1:
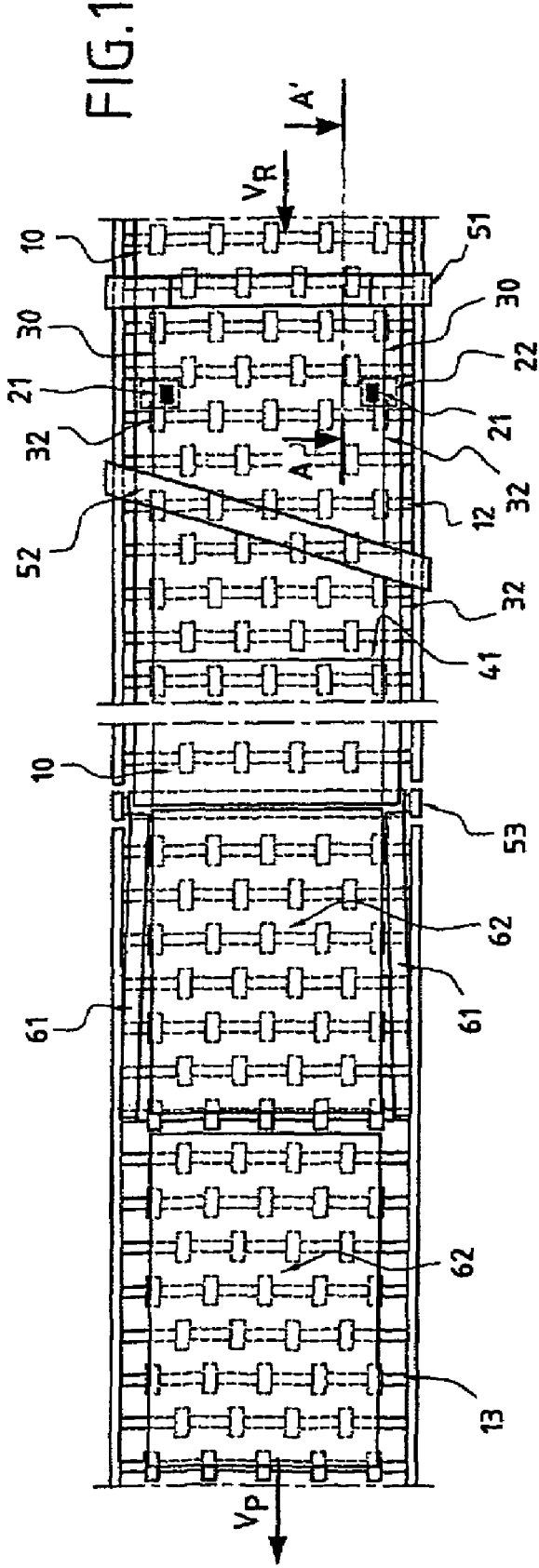
FIG. 1: a part view from above of a line for producing and cutting a continuous flat glass ribbon.

It is first of all emphasized that, for clarity, the various elements depicted in the figure are not all strictly to scale FIG. 1 depicts a partial view from above of a line for producing and cutting a continuous flat glass ribbon.

The flat glass ribbon 10 usually comes from an annealing region and enters the cutting region at a ribbon travel velocity denoted $V_R$, carried by drive rolls 12. This ribbon generally has imperfections on each of its external edges, these imperfections being due in particular to marking by tools, for example known as top rolls, to control the width of the ribbon by pulling or compressing the edges. In the case of thick glass ribbon, the edges are generally not as thick as the average thickness of the ribbon and, conversely, in the case of thin glass ribbons, the edges are thicker than the average thickness of the ribbon.

To remove these edges, an edge trimming operation is performed. This operation usually begins with a longitudinal marking step, using a marking means 51 near each of the outside edges of the ribbon, particularly using a cutting wheel 11. A practically continuous notched line 30 is thus marked into the glass in the longitudinal direction of the ribbon.

The line for producing and cutting the glass ribbon comprises, downstream of the longitudinal marking means 51, transverse marking means 52 that generate a transverse marked line 41, then a breaking member here depicted in the form of a roll 53, which lifts up under each transverse marked line 41 to divide a plate 62 from the continuous ribbon 10. The drive rolls 13, situated after the breaking member 53, drive the cut plates at a velocity $V_P$ higher than the velocity at which the continuous ribbon $V_R$ travels, so as to allow subsequent extraction of the plates, usually by lifting them up, after which they can be stacked.

The invention provides a means located between the longitudinal marking means 51 and the transverse marking means 52, for generating a penetrating crack from the longitudinal marked line 30. Here, this means has been depicted in the form of a wheel 21 situated under the glass ribbon and mounted on a base bearing a ram 22.

This wheel is situated approximately mid-way between the longitudinal marking means 51 and the transverse marking means 52. This wheel may in particular be situated a distance of 0.60 to 1 meter downstream of the longitudinal marking means 51. A longitudinal crack, particularly a penetrating one, develops on each side of the outside edges of the glass ribbon 10. After the transverse breaking operation obtained by virtue of the roll 53, the plate 61 separates from the ribbon 10 and at the same time the edge strips 61 on each of the side edges of the plate 62 separate and are removed.

Figure 2:
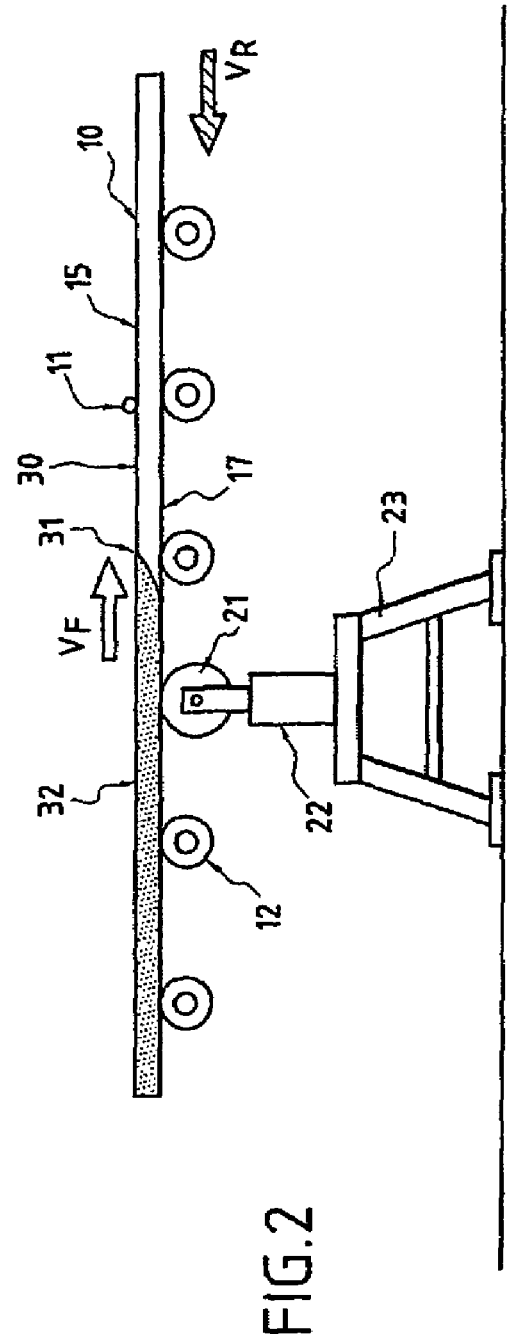
FIG. 2: a part view on section A–A' of FIG. 1.

FIG. 2 depicts a part view in section on A–A' of the preceding Figure. The observation point is facing the edge face of the continuous glass ribbon 10 and makes it possible to provide further detail on the step of generating and propagating the longitudinal crack 32. In the scenario depicted here, this longitudinal crack is a penetrating one. After the cutting wheel 11 has made its mark 30 on the top side 15 of the glass ribbon, the crack begins to develop from a point 31 known as the top of the crack until it progressively passes through the thickness of the edge face of the glass ribbon 10. This crack propagates at a velocity $V_F$ in the opposite direction to the velocity at which the ribbon $V_R$ propagates, and of approximately equal magnitude.

In order to generate and propagate this crack 32, a force is applied to the underside 17 of the glass ribbon using the wheel 21 mounted on the ram 22 which is fixed to the ground by a support, for example by the tripod 23.

Figure 3:
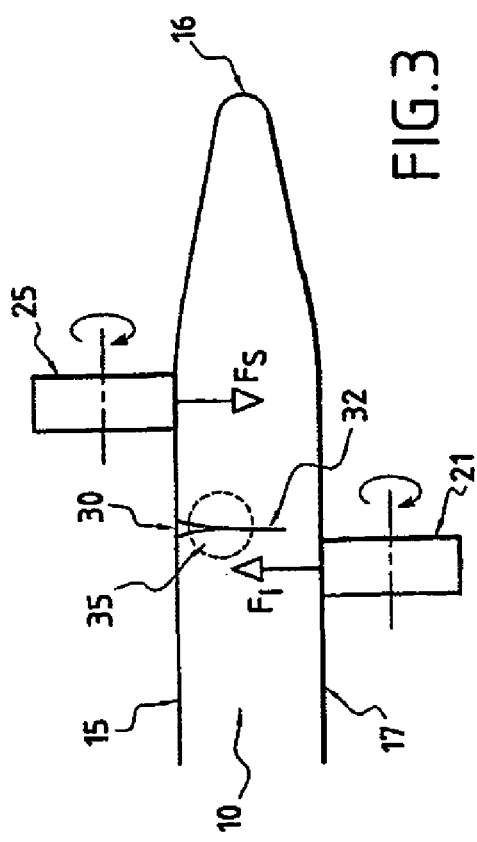
FIG. 3: a part view in section at right angles 10 to the axis of travel of the glass ribbon.

FIG. 3: depicts a part view in section perpendicular to the axis of travel of the glass ribbon, situated between the marking means 51 and the wheel 21. FIG. 3 depicts an enlargement of the region close to an outside edge of the ribbon 10, in a view transverse to the axis of travel of the ribbon. This provides further specifics as to the location of the wheel 21 in contact with the underside 17 of the glass ribbon. In this depiction, the wheel 21 is situated in a region close to the crack 32, situated on the opposite side of the marked line 30 from the outside edge 16 of the glass ribbon 10. This wheel 21 may also be arranged under the marked line 30. A force $F_I$ is thus applied and this creates, in the edge face of the ribbon, a region 35 that is in extension.

As shown also FIG. 3, it is possible to use a wheel 25 bearing against the top side 15 of the glass ribbon and that allows a force $F_s$ to be applied, this force also contributing to generating extensile stresses in line with the marked line 30, in the region 35. This wheel 25 is situated in the region lying between the marked line 30 and the outside edge 16 of the glass ribbon 10.

Figure 4:
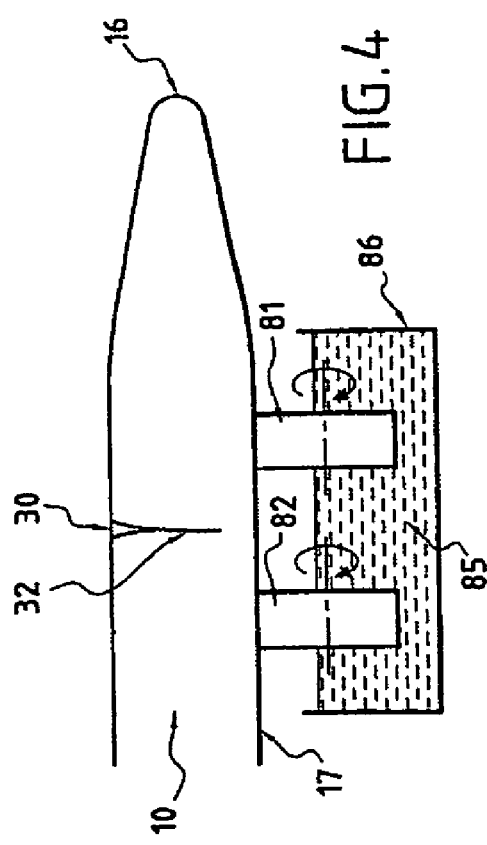
FIG. 4: an alternative form of the part view in section at right angles to the axis of travel of the glass ribbon.

FIG. 4 depicts an alternative form of the embodiment according to the invention, observed from the same viewpoint as FIG. 3.

In this alternative form, rolls 81, 82 are arranged in contact with the underside 17 of the continuous glass ribbon 10, on each side of the longitudinal marked line 30. These rolls are cooled by immersion in a liquid 85, at a temperature below ambient temperature, contained in a bath 86.

This results in forces that lead to the generation followed by the propagation of the crack 32 from the marked line 30.

Another embodiment of this alternative form may be obtained with rolls 81, 82 cooled by the circulation of liquid nitrogen within these rolls.

This device is particularly suited to the production of thin glass.

It is also possible to associate one of the above cooling systems with the roll 21 described in FIG. 3.

Figure 5:
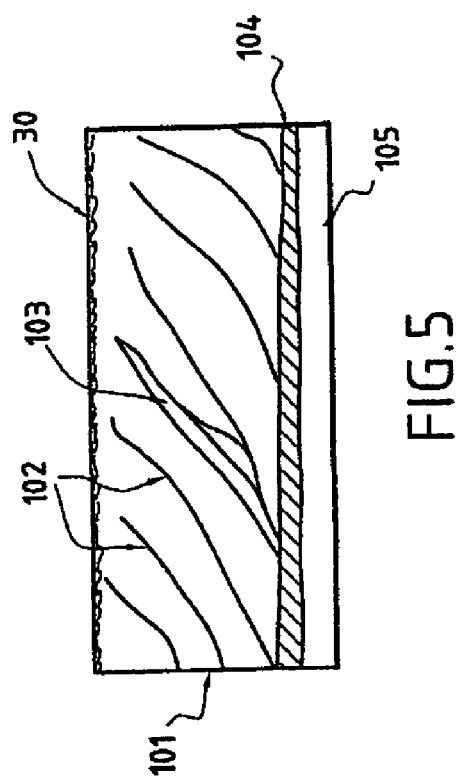
FIG. 5: a view of an edge-trimmed edge of a thick glass plate obtained from a continuous glass ribbon according to the conventional edge-trimming techniques.

FIG. 5 depicts the edge face 101 of a thick glass plate, the edge of which has been trimmed off using traditional techniques. This observation example corresponds to an edge face where the edge has been parted by impact, particularly the shock of a pneumatic hammer tapping on the underside of the sheet to cause the crack to propagate to allow the edge strips to be parted from the edges of the main body of the plate. Numerous defects can be seen, particularly lines 102 that lead to the formation of flakes 103, a rough region 104 that can be attributed to the rapid propagation of the crack, and a region 105 generally at an angle.

Figure 6:
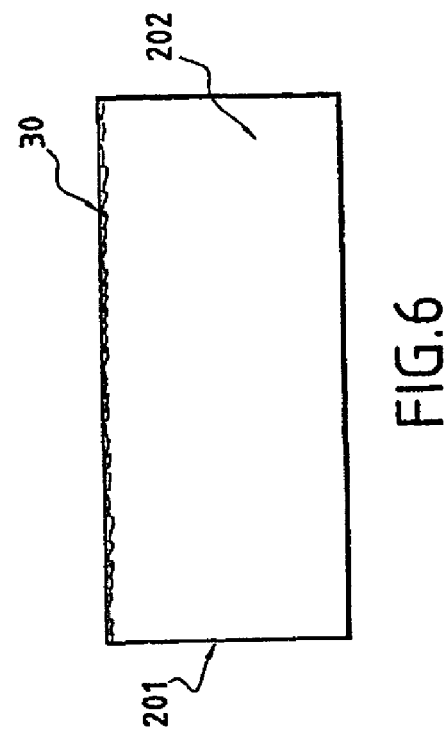
FIG 6: a view of an edge-trimmed edge of a thick glass plate obtained from a continuous glass ribbon, according to the invention.

FIG. 6 depicts the edge face 201 of a thick glass plate, the edge of which has been trimmed off using the method according to the invention. The surface of this edge face 201 is smooth. Note the presence of the route of the longitudinal marked line 30. The region situated beyond this marked line is a mirror region 202.

The invention is not restricted to these particular embodiments and must be interpreted nonlimitingly and as encompassing any method for cutting the edges of a continuous glass ribbon traveling at a velocity $V_R$, comprising a longitudinal marking step that generates a marked line, particularly using a cutting wheel, a subsequent transverse marking step, followed by a transverse-breaking step and that comprises an intermediate step between the longitudinal marking step and the transverse marking step that consists in generating at least one longitudinal crack in at least a substantial part of the thickness of the continuous glass ribbon, particularly throughout the thickness of said continuous glass ribbon, from the marked line and in causing said longitudinal crack to propagate at a velocity $V_F$ roughly equal to and in the opposite direction from the velocity $V_R$ with which the continuous glass ribbon is traveling.

The invention claimed is:

1. A method for cutting edges of a continuous glass ribbon including a top side and an underside traveling at a velocity, comprising:
a longitudinal marking to generate a longitudinal marked line defining at least one edge strip;
a subsequent transverse marking;
a transverse breaking, comprising, after the longitudinal marking, generating at least one longitudinal crack in at least a substantial part of a thickness of the continuous glass ribbon, from the longitudinal marked line, wherein the longitudinal crack is made to propagate at a velocity roughly equal to and in an opposite direction from the velocity at which the continuous glass ribbon is traveling, and the transverse breaking comes after the generating at least one longitudinal crack; and
separating the at least one edge strip from the continuous glass ribbon at the same time as the transverse breaking.

2. The method as claimed in claim 1, wherein the generating at least one longitudinal crack is an intermediate operation between the longitudinal marking and the transverse marking.

3. The cutting method as claimed in claim 1, wherein the longitudinal crack is generated and propagates by progressive bending of the continuous glass ribbon in a region situated under the longitudinal marked line between the longitudinal marking and the transverse marking.

4. The cutting method as claimed in claim 1, wherein the continuous glass ribbon is bent by applying a force to the underside of said continuous glass ribbon to lift the glass ribbon slightly in a region situated under the longitudinal marked line or alternatively near the longitudinal marked line on a side of the longitudinal marked line furthest away from an outside edge of the ribbon when considering a closest outside edge.

5. The cutting method as claimed in claim 3, wherein a force is applied to the top side of the continuous glass ribbon in a region lying between the longitudinal marked line and an outside edge closest to said longitudinal marked line to contribute to the generation and propagation of the longitudinal crack.

6. The cutting method as claimed in claim 1, wherein one or more additions of heat and/or of cooling contribute to the generation and propagation of the longitudinal crack.

7. The method as claimed in claim 1, wherein the longitudinal marking is performed on just one of the sides of the ribbon, and wherein the transverse marking is performed on just one of the sides of the ribbon.

8. A glass plate obtained by the method as claimed in claim 1, wherein longitudinal edge faces are substantially perpendicular to an underside and a top side of the glass plate, and wherein said longitudinal edge faces have a mirrored surface.

9. The use of the glass plate as claimed in claim 8 for producing products made of thick glass, at least 10 mm thick, for applications in building or interior decorating.

10. The use of the glass plate as claimed in claim 8 for producing products in thin glass, of 1 mm thick or less.

11. The use of the glass plate as claimed in claim 8 for producing articles made of toughened glass.

12. A device for cutting a continuous glass ribbon traveling at a velocity, using a method comprising:
a longitudinal marking to generate a longitudinal marked line defining at least one edge strip,
a subsequent transverse marking step; and
a transverse breaking comprising:
(a) longitudinal marking means,
(b) means for generating and causing propagation of a longitudinal crack in at least a substantial part of a thickness of the continuous glass ribbon, from the longitudinal marked line and causing the longitudinal crack to propagate at a velocity roughly equal to and in an opposite direction from the velocity at which the continuous glass ribbon is traveling and separating the at least one edge strip from the continuous glass ribbon at the same time as the transverse breaking,
(c) transverse marking means, and
(d) transverse breaking means,
the transverse breaking means being placed after the longitudinal marking means, the means for generating and causing propagation, and the transverse marking means with reference to a direction in which the ribbon is traveling.

13. The device as claimed in claim 12, wherein the means are placed in an order of the longitudinal marking means, means for generating and causing propagation, transverse marking means, and transverse breaking means with reference to the direction in which the ribbon is traveling.

14. The device as claimed in claim 13, wherein the means for generating and causing propagation of the longitudinal crack comprises mechanical means.

15. The device as claimed in claim 14, wherein at least one of the mechanical means for generating and propagating the longitudinal crack is a wheel configured to be brought into contact with an underside of the continuous glass ribbon.

16. The device as claimed in claim 15, wherein the at least one wheel is slaved by slaving means, comprising a ram, connected to a base, such that either a position of the wheel is fixed or a force applied under the continuous glass ribbon is constant.

17. The device as claimed in claim 14, wherein at least one of the mechanical means for generating and propagating the longitudinal crack is a wheel situated on a top side of the continuous glass ribbon.

18. The device as claimed in claim 12, further comprising at least one means for applying heat and/or cooling to at least one region of one side of the continuous glass ribbon situated between the longitudinal marking means and the transverse marking means.

19. The device as claimed in claim 18, wherein the at least one means of applying heat and/or cooling is a roll in contact with a top or bottom surface of the continuous glass ribbon.

20. The device as claimed in claim 18, wherein the at least one means of applying heat and/or cooling comprises a laser.

* * * * *